United States Patent
Cohen

(10) Patent No.: US 6,310,544 B1
(45) Date of Patent: Oct. 30, 2001

(54) SELF-CONTAINED ADD-ON ACCESSORY FOR AN ANALOG METERING DEVICE SUCH AS A SPEEDOMETER OR TACHOMETER

(75) Inventor: Marc S. Cohen, 4850 W. Morse, Lincolnwood, IL (US) 60712

(73) Assignee: Marc S. Cohen, Lincolnwood, IL (US)

( * ) Notice: Subject to any disclaimer, the term of this patent is extended or adjusted under 35 U.S.C. 154(b) by 0 days.

(21) Appl. No.: 09/414,186

(22) Filed: Oct. 7, 1999

(51) Int. Cl.⁷ .................................................. B60Q 1/00
(52) U.S. Cl. ...................... 340/438; 340/441; 340/466; 340/936; 340/961; 340/457; 116/116; 116/334; 116/57
(58) Field of Search ..................... 340/438, 441, 340/457, 936, 575; 116/57, 62.3

(56) References Cited

U.S. PATENT DOCUMENTS

| | | | |
|---|---|---|---|
| 3,980,041 | 9/1976 | Evans | 116/116 |
| 4,095,553 | 6/1978 | Ono et al. | 116/116 |
| 4,308,527 | * 12/1981 | Moreau et al. | 340/326 |
| 4,633,803 | 1/1987 | Flowers | 116/334 |
| 5,554,970 | * 9/1996 | Mottahedeh | 340/441 |

\* cited by examiner

*Primary Examiner*—Daryl Pope
(74) *Attorney, Agent, or Firm*—Greer, Burns & Crain, Ltd.

(57) ABSTRACT

A self-contained accessory for an analog metering device such as a speedometer or tachometer. The accessory includes a sensor which is selectively adjustable to align with a plurality of positions in the range of movement of an output needle of the analog metering device. In the preferred embodiment, the sensor is alignable with gradation marks, e.g., miles per hour indicia on a speedometer, and the accessory provides a clear indication when a needle reaches a selected gradation. The indication alerts a user that a selected gradation has been reached by an output needle of the analog metering device. The accessory attaches to a cover of the analog metering device and allows adjustment of sensor position without removal of the accessory from the cover.

9 Claims, 1 Drawing Sheet

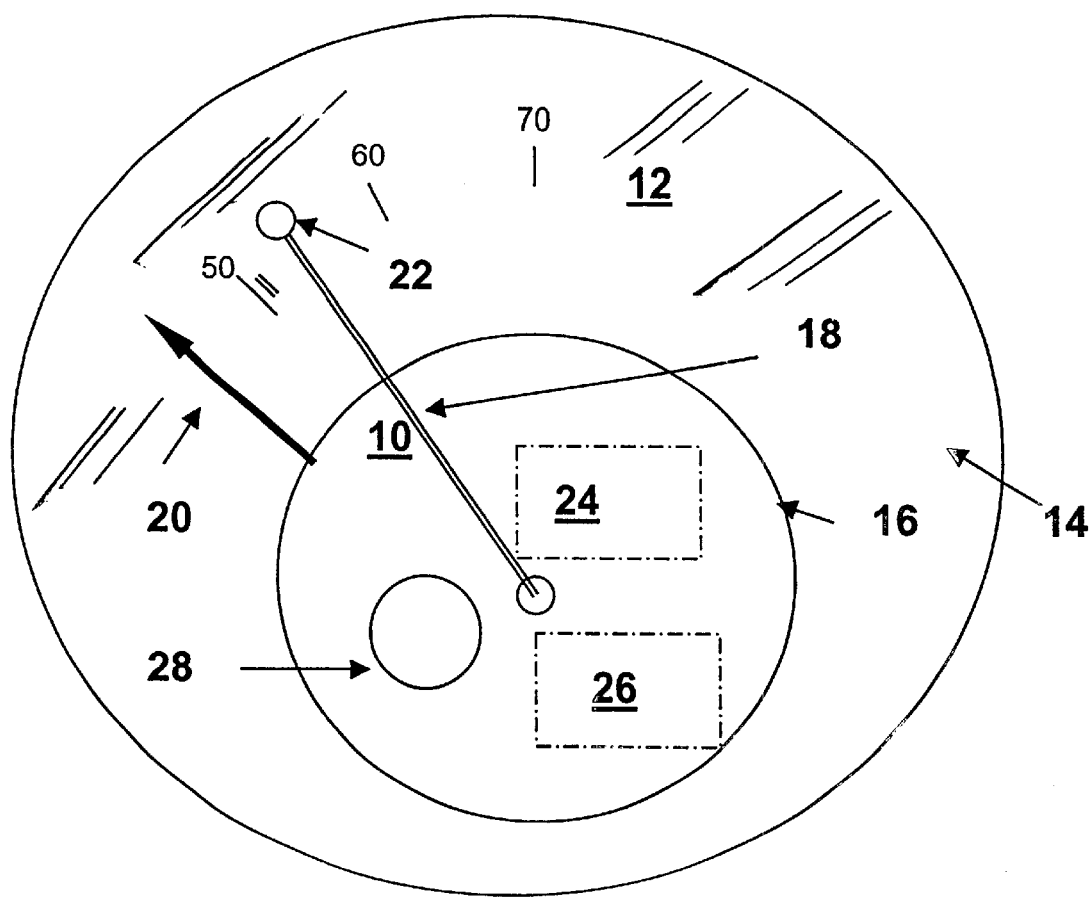

SELF-CONTAINED ADD-ON ACCESSORY FOR AN ANALOG METERING DEVICE SUCH AS A SPEEDOMETER OR TACHOMETER

FIELD OF THE INVENTION

The present invention generally concerns analog metering devices having moving needles. The invention is particularly suitable as an add-on accessory to a speedometer or a tachometer.

BACKGROUND OF THE INVENTION

Speedometers, tachometers, and similar devices provide critical information to drivers of motor vehicles. Use of the information provided by such an instrument, however, requires an operator to divert attention away from the environment in which the vehicle is being operated. Although only momentary, it is better that an operator rarely, if ever, need to divert attention away from the environment since reference of the environment surrounding the motor vehicle is critical to safety of operation.

Various devices have been previously developed to address this general concern. Cruise control, for example, automatically regulates the speed of a vehicle's operation to a desired speed. Operation of the cruise control requires at least one glance away from the environment to set the desired speed. In addition, cruise control has limited utility in situations involving significant traffic where a steady cruising speed cannot be obtained. A head-up display is another effort to provide drivers information without requiring a diversion of attention away from the environment. These displays have found limited acceptance and use in practice, though. These two techniques also represent techniques which typically must be installed as original equipment, or added on at significant expense. This further limits their application in practice.

U.S. Patent No. 3,980,041 to Evans seeks to provide an add-on speedometer speed warning indicator which could be applied to the clear cover of a speedometer without disassembly of the speedometer. The Evans device is a plastic plate which adheres to the cover of a speedometer such that once a critical speed is reached further acceleration of the vehicle will cause the needle in the speedometer to be hidden from view. Though this device obviates the need to disassemble a speedometer for use of the device, it fails to solve the problem of diverting an operator's attention away from the vehicle's operating environment. In addition, adjustment of the device is rather cumbersome since it requires removal of a plate and replacement with a differently conFIGUREd, recut or repositioned plate.

Thus, there is a need for an add-on accessory which alerts an operator when a critical value is indicated by the output of an analog metering device without requiring the operator to look at the analog meter. Such an add-on accessory should be adjustable so that the operator may readily and conveniently select a desired critical value. Such a device is provided by the present invention.

SUMMARY OF THE INVENTION

The present invention is a self-contained accessory for an analog metering device such as a speedometer or tachometer. The accessory mounts to the clear cover of a metering device through adhesive, suction, or other suitable means. The accessory includes a selectively adjustable sensor which can be moved to a plurality of positions corresponding to operational positions of the needle of the analog metering device. A user aligns the sensor with one of the gradation marks of the metering device. An alarm preferably contained in the accessory will alert a user when the needle becomes aligned with the sensor.

The housing for the accessory is small enough that it doesn't obscure the information contained on the face of the metering device. The housing includes a power source and the alarm which is responsive to the sensor. Preferably, the sensor is mounted on a rotationally adjustable arm that extends from the housing. In the preferred embodiment, the alarm indicator is an audible indicator. However, it is contemplated that a visual or other suitable indicator may be used so long as it is able to catch the attention of an operator without requiring the user to look away from a vehicle's operating environment.

BRIEF DESCRIPTION OF THE DRAWING

Other features, objects and advantages of the invention will be apparent to those skilled in the art by reference to the detailed description and the drawing FIGURE.

The FIGURE is a schematic diagram for illustrating the accessory of the present invention.

DETAILED DESCRIPTION OF THE INVENTION

The accessory of the invention is self-contained and is affixed to the cover of an analog metering device such as a speedometer or tachometer. The description herein is primarily directed toward application of the accessory to a speedometer, but it will be understood that the accessory of the invention has applicability to similar analog metering devices.

Referring to the FIGURE, an accessory 10 of the invention is shown affixed to a speedometer 12. The speedometer 12 includes a clear cover 14. The accessory 10 includes a housing 16 which attaches, through adhesive, Velcro®, or other suitable means, to a portion of the clear cover 14 without obscuring indicia used on a face of the speedometer 12 to indicate speed. However, a suction cup is a preferred method for attachment of the housing 16 to the cover 14. The suction cup will adhere the housing 16 to the cover 14, while providing simple means for attachment, removal, and adjustment of the accessory 10. The indicia on the speedometer 12 will typically include numbers and large and small gradation marks. Large gradation marks are often associated with speeds such as 50, 60, 70, 80 mph, etc., while smaller gradation marks typically equally divide the space between the larger gradation marks by 10, for example.

The accessory 10 of the preferred embodiment includes an arm 18 that extends away from the housing 16 in a fashion which makes it alignable with a plurality of gradation marks on the speedometer 12, or other similar analog metering device. The arm 18 is rotatably mounted as shown in the FIGURE due to the nature of the particular speedometer 12 shown in the FIGURE. The exact nature of movement given the arm 18, or other similar member, will depend upon the nature of the particular metering device to which it attaches. For example, it is contemplated that a sliding member may be used to align with gradation marks of analog metering devices having a more rectilinear movement of a needle 20 that indicates the measured output of the metering device. The arm 18, or other suitable member, must be alignable with a plurality of the gradation marks with which the needle 20 aligns with. The purpose of the member 18 is to carry a sensor 22 relied upon to detect when the needle 20 aligns with the sensor 22.

The sensor is a small and low power sensor typically requiring no more than a couple of volts to operate. The sensor may be optical, it may be a motion sensor, or other type of sensor capable of detecting alignment of the needle 20 with the sensor 22. Signals from the sensor 22 and power to the sensor 22 are preferably communicated through wires which can be disposed in the arm 18 if it is hollow or includes a suitable slot for accepting the wires.

Power is supplied to the sensor by a power source 24 preferably included in the housing 16. The power source 24 may comprise, for example, small size batteries. The cover 16 may include a removal panel for placement and replacement of the batteries. Common batteries, e.g., size AAA, are preferable to special purpose batteries such as those used in organizers, watches and calculators. Signaling from the sensor 22 is to circuitry 26 for driving an indicator, such as an audible speaker 28. The circuitry 26 may be simple driving circuitry, or may comprise control electronics to control the indicator 28 in any desirable manner responsive to the sensor 22. The indicator 28 alternatively may comprise a visual indicator, but a visual indication should be prominent enough to catch an operator's attention without requiring a direct look at the accessory 10 or speedometer 12.

The sensor 22 is preferably sensitive enough to detect when the needle 20 is aligned with a particular gradation of the speedometer 12. Less sensitive tolerances are possible, but then the accessory 10 will only be capable of detecting when the needle 20 enters a particular range, such as a 2 or 5 mph speedometer range, as opposed to a single mph indicated by a single gradation on the face. It is also preferable to have the sensor 22 adjustable through a significant range of the needle 22, such as 90%, to provide a wide range of settings at which an alarm indication will be given.

Thus, the invention provides a removable and self-contained add-on accessory for a metering device which provides a convenient indication when a particular output of the analog metering device has been reached. An operator need not have his or her visual attention directed to the metering device. Instead, a notification is provided when a selected output has been reached. The selected output is adjustable without removing the accessory of the invention, allowing an operator to change the point of output when a notification is provided. These and other advantages of the invention will be apparent to those skilled in the art.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A self-contained add-on accessory for an analog metering device having a moving needle as an indicator of a measured output parameter, the accessory comprising:

a housing dimensioned to fit on a portion of a cover of the analog metering device without obscuring gradation marks on a face of the analog metering device;

a selectively adjustable member extending from the housing and alignable with a plurality of different gradation marks on the face of the analog metering device;

a sensor mounted in associated with said selectively adjustable member to detect when an output needle of the analog metering device reaches a gradation on the face of the analog device with which said selectively adjustable member has been aligned; and a power source within said housing for powering said sensor.

2. The accessory of claim 1, wherein said sensor is mounted near a terminal end of said selectively adjustable member.

3. The accessory of claim 1, wherein said sensor comprises an optical sensor.

4. The accessory of claim 1, wherein said sensor comprises a motion sensor.

5. The accessory of claim 1, wherein said sensor has a limited detection range which approximately encompasses a single gradation of the analog metering device.

6. A self-contained add-on accessory for an analog metering device having a moving needle as an indicator of a measured output parameter, the accessory comprising:

a sensor adjustable to a plurality of positions over a range of movement of the needle;

a power source for powering said sensor; and a mount to mount the sensor and the power source on a portion of a cover of the analog metering device.

7. The accessory of claim 1, further comprising an indicator associated with said housing, powered by said power source and responsive to said sensor.

8. The accessory of claim 7, wherein said indicator comprises an audible indicator.

9. The accessory of claim 6, further comprising an indicator responsive to said sensor, powered by said power source and mounted by said mount for indicating alignment of the needle with said sensor.

* * * * *